United States Patent
Follestad et al.

(10) Patent No.: US 6,995,219 B2
(45) Date of Patent: Feb. 7, 2006

(54) OLEFIN POLYMERIZATION PROCESS

(75) Inventors: Arild Follestad, Stathelle (NO); Richard Blom, Oslo (NO); Ivar Martin Dahl, Oslo (NO); Erling Rytter, Trondheim (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/477,133

(22) PCT Filed: May 10, 2002

(86) PCT No.: PCT/GB02/02151

§ 371 (c)(1),
(2), (4) Date: May 13, 2004

(87) PCT Pub. No.: WO02/090398

PCT Pub. Date: Nov. 14, 2002

(65) Prior Publication Data

US 2004/0236043 A1    Nov. 25, 2004

(30) Foreign Application Priority Data

May 10, 2001   (GB) .................... 0111443

(51) Int. Cl.
C08F 4/606   (2006.01)
C08F 4/646   (2006.01)
C08F 4/649   (2006.01)
C08F 4/609   (2006.01)

(52) U.S. Cl. ............. 526/118; 526/113; 526/114; 526/116; 526/119; 526/193; 526/204; 526/222; 526/943

(58) Field of Classification Search ........... 526/113, 526/114, 116, 118, 119, 193, 204, 222
See application file for complete search history.

(56) References Cited

U.S. PATENT DOCUMENTS

| 4,239,870 A | | 12/1980 | Smith |
| 4,530,914 A | * | 7/1985 | Ewen et al. ............. 502/113 |
| 5,525,678 A | | 6/1996 | Mink et al. |
| 5,527,752 A | | 6/1996 | Reichle et al. |
| 5,587,501 A | | 12/1996 | Winter et al. |
| 5,635,437 A | * | 6/1997 | Burkhardt et al. ....... 502/104 |
| 5,700,886 A | | 12/1997 | Winter et al. |
| 6,022,933 A | | 2/2000 | Wright et al. |
| 6,031,055 A | * | 2/2000 | Auburn et al. ........... 526/127 |
| 6,096,677 A | | 8/2000 | Wilson, Jr. |

FOREIGN PATENT DOCUMENTS

| EP | 0 719 797 A2 | 7/1996 |
| EP | 0 719 797 A3 | 4/1997 |
| EP | 0 755 948 A3 | 1/1998 |
| EP | 0 849 286 A | 6/1998 |
| EP | 0 849 286 A1 | 6/1998 |
| WO | WO 93/07189 | 4/1993 |
| WO | WO 95/13305 | 5/1995 |

OTHER PUBLICATIONS

Scheirs and Kaminsky, "Metallocene-based Polyolefins", vol. 2 (2000), p. 245.
Kobayashi, "Catalysis in Precision Polymerization", 1998, p. 28.
US 5,883,203, 03/1999, Cheruvu et al. (withdrawn)

* cited by examiner

Primary Examiner—Caixia Lu
(74) Attorney, Agent, or Firm—Nixon & Vanderhye P.C.

(57) ABSTRACT

The invention relates to a process for the preparation of a multimodal A-olefin polymer comprising polymerizing in a polymerization stage at least one A-olefin in the presence of a multisite catalyst and an adjuvant so as to produce a polymer having a relatively lower molecular weight component and a relatively higher molecular weight component, said adjuvant being selected from the group consisting of phosphines, phosphites, acetylenes, dienes, thiophenes and aluminium alkyls and said adjuvant being capable of altering the ratio of the fraction of higher molecular weight component to the fraction of the lower molecular weight component by at least 10%.

17 Claims, No Drawings

OLEFIN POLYMERIZATION PROCESS

This application is the US national phase of international application PCT/GB02/02151 filed 10 May 2002, which designated the US. PCT/GB02/02151 claims priority to GB Application No. 0111443.82.3 filed 10 May 2001, and CIP to U.S. application Ser. No. 60/297,748 filed 14 Jun. 2001. The entire contents of these applications are incorporated herein by reference.

This invention relates to a process for the preparation of olefin polymers, in particular bimodal or multimodal olefin polymers, in which certain adjuvants are imployed to manipulate the molecular weight and molecular weight distribution of the polymer product.

The preparation of bimodal polymers can be achieved by the use of a variety of particulate multisite catalysts or catalyst mixtures as is well known in the art. The active catalysts may be, for example, mixtures between Ziegler-Natta, η-liganded and chromium oxide type catalysts. Typically, such polymer preparations may be performed by gas phase or slurry polymerisation. In such polymer preparation, each type of catalytic site makes a polymer component with varying characteristics depending on the reactor conditions as well as on the type of active site.

In polymer preparation it is important to control accurately the molecular weight and the molecular weight distribution of the polymers produced. These features are critical to the properties of the polymer. Conventionally, molecular weight has been controlled using hydrogen however, where more than one catalytic compound is present, it may not be possible to set the hydrogen concentration in a reactor at a level such that both catalysts produce the desired polymer components. At a given hydrogen concentration, the first catalytic compound may give a polymer component of desired molecular weight but at the sate hydrogen concentration, the second catalyst may give a component having a molecular weight which is too high or too low. It would therefore be beneficial if there was a further means of controlling molecular weight in combination with or independently of hydrogen.

Moreover, such catalysts are often relatively sensitive and may therefore be easily disturbed or disrupted so that a consistent polymer product is not produced. Such disturbances may be caused during preparation of the catalyst or during polymerisation as process parameters are adjusted. Disturbances may detrimentally influence the molecular weight or molecular weight distribution of the polymer components produced by the catalysts causing inconsistencies or inhomogeneities in the final polymer product. This problem is most noticeable in the preparation of bimodal and multimodal polymer products.

It would therefore be desirable if during an olefin polymerisation process which in general produces a consistent polymer product, inconsistencies in the polymer product can be detected during the actual polymerisation and the ratio of polymer components adjusted accordingly to eliminate such inconsistencies.

Many of the manipulable polymerisation parameters such as comonomer concentration, monomer concentration, hydrogen concentration and reactor temperature are manipulated to alter other properties of the polymer product such as melt flow rate, crystallinity or molecular weight or in order to achieve optimum production economics by high production rate and low catalyst consumption. Such parameters are therefore not only unsuitable for manipulation to ensure a consistent polymer product but also may act to disturb the molecular weight distribution.

In U.S. Pat. No. 5,883,203 the possibility of manipulating molecular weight using cofeeds of electron withdrawing or electron donating substances is described. It is stated that certain electron donating compounds have been found to decrease molecular weight distribution whereas certain electron withdrawing compounds have been found to increase molecular weight.

Catalyst poisons are said to cause a lowering of molecular weight in U.S. Pat. No. 6,022,933.

In U.S. Pat. No. 5,525,678 water or carbon dioxide are fed to a reactor to modify the weight fractions of high and low molecular weight components.

We have now found further adjuvants that may be used to manipulate the molecular weight and molecular weight distribution of polymers during a polymerisation reaction. In particular these adjuvants can be tailored so that they affect the molecular weight of a polymer component produced by one site whilst having little or no affect on the polymer component produced by other catalytic sites.

Moreover, these adjuvants may be used to maintain a consistent polymer product. It any deviation in the ratio of the produced polymer components is detected then the feed rate of the adjuvant, preferably the ratio of adjuvant and feed rate of catalyst may be adjusted accordingly to restore the ratios to their desired values.

Thus, viewed from one aspect the invention provides a process for the preparation of a multimodal, preferably bimodal α-olefin polymer-comprising polymerising in a polymerisation stage at least one α-olefin in the presence of a multisite catalyst and an adjuvant so as to produce a polymer having a relatively lower molecular weight component and a relatively higher molecular weight component, said adjuvant being selected from the group consisting of phosphines, phosphites, acetylenes, dienes, thiophenes and aluminium alkyls and said adjuvant being capable of altering the ratio of the fraction of higher molecular weight component to the fraction of lower molecular weight component by at least 10%.

Viewed from another aspect the invention provides a process for the preparation of a multimodal, preferably bimodal α-olefin polymer comprising polymerising in a polymerisation stage at least one α-olefin in the presence of a multisite catalyst and an adjuvant so as to produce a polymer having a relatively lower molecular weight component and a relatively higher molecular weight component, said adjuvant being selected from the group consisting of phosphines, phosphites, acetylenes, dienes, thiophenes, aluminium alkyls and said adjuvant being capable of increasing or decreasing the weight average molecular weight (Mw) of one component relative to the other by at least 10%.

Viewed from another aspect the invention provides the use of an adjuvant as hereinbefore described to control the molecular weight distribution of a multimodal, preferably bimodal polymer. In particular, the use of an adjuvant selected from the group consisting of phosphines, phosphites, acetylenes, dienes, thiophenes and aluminium alkyls in a process for the preparation of a multimodal, preferably bimodal α-olefin polymer comprising polymerising in a polymerisation stage at least one α-olefin in the presence of a multisite catalyst and said adjuvant so as to produce a polymer having a relatively lower molecular weight component and a relatively higher molecular weight component, said adjuvant being capable of altering the ratio of higher molecular weight component to lower molecular weight component by at least 10%.

Viewed from yet another aspect the invention provides the use of an adjuvant as hereinbefore described to control the molecular weight of one component of a multimodal or bimodal polymer. In particular, use of an adjuvant selected from the group consisting of phosphines, phosphites, acetylenes, dienes, thiophenes, and aluminium alkyls in a process for the preparation of a multimodal, preferably bimodal α-olefin polymer comprising polymerising in a polymerisation stage at least one α-olefin in the presence of a multisite catalyst and an adjuvant so as to produce a polymer having a relatively lower molecular weight component and a relatively higher molecular weight component, said adjuvant being capable of increasing or decreasing the molecular weight of one component relative to the other by at least 10%.

Viewed from another aspect the invention provides a polymer obtained by the process as hereinbefore described.

The multisite catalyst composition employed in the process of the invention is one capable of producing a bimodal or multimodal polymer. By bimodal is meant that the polymer has two distinct molecular weight fractions. A multimodal polymer has more than two distinct molecular weight fractions. These terms are well known to the person skilled in the art since they may show as peaks, shoulders or tails on GPC curves. Particular molecular weight fractions may also possess certain stereochemistry or branching which may help identify them.

By multisite catalyst is meant a catalyst in which at least two different types of active site have been derived from at least two chemically different types of active site precursors.

The multisite catalyst of use in the invention therefore needs to comprise at least two active catalytic compounds, one capable of producing a relatively higher molecular weight component and one capable of producing a relatively lower molecular weight component. This may be achieved by providing a mixture of two or more particulate catalysts each made using one type of active site precursor, but preferably, the multisite catalyst comprises a particulate multisite catalyst where at least two active catalytic compounds have been incorporated into the same catalyst particle. Especially preferably the catalyst composition is a particulate dualsite catalyst and catalytic compounds are present within catalyst particles.

The multisite catalyst of use in the invention may therefore be made up from a mixture of two different active site precursors selected from catalytically effective metal:η-ligand complexes or chromium catalysts. Similarly, the particulate multisite catalyst may be made up from a carrier comprising a metal:η-ligand complex and a chromium site or a mixture of metal:η-ligand complexes or chromium catalysts. In a further embodiment, the multisite catalyst may comprise a metal:η-ligand complex and an active site precursor complex having a bidentate, tridentate or tetradentate ligand. Preferably two or more of the catalyst sites are metal η-ligand complexes.

Suitable multisite catalysts may be provided by the combination on a single support of two single site catalysts such as the catalytically effective metal:η-ligand complexes, ie. complexes in which the metal is complexed by the extended Π-orbital system of an organic ligand. Such catalysts will be readily prepared by the person skilled in the art and their preparation is comprehensively described in WO98/57998 which is herein incorporated by reference. Metallocenes are an example of complexes in which a metal is complexed by two η-ligands—in the present invention metal:η-ligand complexes may be used where the metal is complexed by one, two or more η-ligands. The use of twin η-ligand metallocenes and single η-ligand "half metallocenes" (e.g. those developed by Dow) is particularly preferred. However the term metallocene as used herein is used to refer to all such catalytically active complexes containing one or more η-ligands. The metal in such complexes is preferably a group 4, 5, 6, 7 or 8 metal or a lanthanide or actinide, especially a group 4, 5 or 6 metal, particularly Zr, Hf or Ti. The η-ligand preferably comprises a cyclopentadienyl ring, optionally with a ring carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Examples of such homo or heterocyclic cyclopentadienyl ligands are well known from the scientific and patent literature, e.g. from the published patent applications of Hoechst, Montell, Borealis, Exxon, and Dow, for example EP-A-416815, WO96/04290, EP-A-485821, EP-A-485823, U.S. Pat. No. 5,276,208 and U.S. Pat. No. 5,145,819.

Thus the η-bonding ligand may for example be of formula I

$$CpY_m \qquad (I)$$

where Cp is an unsubstituted, mono-substituted or polysubstituted homo or heterocyclic cyclopentadienyl, indenyl, tetrahydroindenyl, fluorenyl, benzindenyl, cyclopenta[1]phenanthrenyl, azulenyl, or octahydrofluorenyl ligand; m is zero or an integer having a value of 1, 2, 3, 4 or 5; and where present each Y which may be the same or different is a substituent attached to the cyclopentadienyl ring moiety of Cp and selected from halogen atoms, and alkyl, alkenyl, aryl, aralkyl, alkoxy, alkylthio, alkylamino, $(alkyl)_2P$, alkylsilyloxy, alkylgermyloxy, acyl and acyloxy groups or one Y comprises an atom or group providing an atom chain comprising 1 to 4 atoms selected from C, O, S, N, Si and P, especially C and Si (e.g. an ethylene group) to a second unsubstituted, mono-substituted or polysubstituted homo or heterocyclic cyclopentadienyl, indenyl, tetrahydroindenyl, fluorenyl or octahydrofluorenyl ligand group.

In the η-bonding ligands of formula I, the rings fused to the homo or hetero cyclopentadienyl rings may themselves be optionally substituted e.g. by halogen atoms or groups containing 1 to 10 carbon atoms.

Many examples of such η-bonding ligands and their synthesis are known from the literature, see for example: Möhring et al. J. Organomet. Chem 479:1–29 (1994), Brintzinger et al. Angew. Chem. Int. Ed. Engl. 34:1143–1170 (1995).

Examples of suitable η-bonding ligands include the following:

cyclopentadienyl, indenyl, fluorenyl, pentamethyl-cyclopentadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butylcyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indeny, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Besides the η-ligand, the catalyst complex used according to the invention may include other ligands; typically these may be halide, hydride, alkyl, aryl, alkoxy, aryloxy, amide, carbamide or other two electron donor groups.

Thus, in a preferred embodiment the multisite catalyst composition comprises two η-ligand sites, most preferably a combination of an unbridged (preferably alkyl substituted) metallocene comprising two η-ligands and a substituted silicon or carbon bridged bis(η-ligand) metallocene.

Without wishing to be limited by theory, it is believed that the bridged metallocene species gives rise to a polymer having relatively higher molecular weight whilst the non-bridged species gives rise to the relatively lower molecular weight component. The bridged metallocene species may be replaced by a half-metallocene species which also yields polymer components of relatively higher molecular weight.

The non-bridged species which produces the lower molecular weight component may carry substituents on the η-ligands which may serve to lower the molecular weight of the produced polymer component further and increase activity.

Especially preferred high molecular weight forming catalyst compounds include bis(η-ligand) metallocenes having a 1 or 2 atom carbon or silicon bridge. The metal of the metallocene is preferably Zr or Hf and preferably carries σ-ligands e.g. chloride, i.e. $ZrCl_2$. The η-ligands should preferably be indenyl species which may be substituted by 1, 2, 3 or 4 $C_{1-6}$ alkyl groups Especially preferred lower molecular weight forming catalyst compounds are those comprising two non-bridged η-ligand species, preferably cyclopentadienyl species which may carry 1, 2, 3 or 4 $C_{1-6}$ alkyl groups. The metal of the metallocene is preferably Zr or Hf and preferably carries σ-ligands e.g. chloride or $diC_{1-6}$-alkylamino, e.g. $ZrCl_2$ or $Zr(NEt_2)Cl$.

In a highly preferred embodiment, the multisite catalyst is formed from a catalyst of formula $Cp^*_2ZrCl_2$ (LMW) and $Me_2Si(4-Ph)-2-MeIndZrCl_2$ (HMW) where Cp* represents pentamethylcyclopentadienyl.

Where a chromium oxide catalyst is employed, these for example may be prepared by impregnating a chromium compound that will give chromium oxide when calcined such as $Cr(acetate)_3$ or $CrO_3$. The Cr compound may be impregnated into particles of an inorganic particulate support material, e.g. silica, alumina, aluminium phosphate, optionally with titania. Alternatively, the Cr compound may be co-precipitated from an aqueous solution together with inorganic material, especially hydroxides and oxides of Si, Al and Ti. The support with the Cr is then activated in an oxidising atmosphere e.g. dry air at a temperature of 500–950° C. Then, optionally, subsequent to the oxidising atmosphere stage, an atmosphere with carbon monoxide is passed through the particulate catalyst in an amount sufficient to reduce the major part of Cr to divalent form at a temperature of 250–400° C.

The process of the invention is one for the polymerization of α-olefins, in particular $C_{2-10}$ α-olefins, more particularly ethylene and propylene, especially ethylene. The polymer produced by each catalytic compound may be a homopolymer or a copolymer (which term is used to include polymers deriving from two or more monomer species). Preferably however, the catalytic compounds produce copolymer components or an ethylene homopolymer. Where each polymer component is a copolymer, preferably at least 50% by weight of the polymer derives from a $C_{2-10}$ α-olefin monomer, more particularly from a $C_{2-4}$ α-olefin monomer, preferably ethylene or propylene. The other monomer(s) may be any monomers capable of copolymerization with the olefin monomer, preferably mono or polyunsaturated $C_{2-20}$ compounds, in particular monoenes or dienes, especially $C_{2-10}$ α-olefin such as ethene, propene, but-l-ene, pent-l-ene; hex-l-ene, oct-l-ene or mixtures thereof. Bulky comonomers, e.g. styrene or norbornene may also be used.

Thus each polymer component will preferably be an ethylene homopolymer, an ethylene copolymer (especially with propylene), a propylene homopolymer or a propylene copolymer (especially with ethylene).

The adjuvants to be used to adjust the molecular weight and/or molecular weight distribution of the polymer components are selected from the group consisting of phosphates, phosphines, acetylenes, dienes, thiophenes and aluminium alkyls.

Phosphites of use in the invention may be those of formula $(RO)_3P$ where each R independently represents a $C_{1-20}$ alkyl group, a $C_{6-18}$ aryl group or a $C_{7-20}$ alkylaryl group. Other preferred phosphate adjuvants are those sold under the Alkanox trade name. Especially preferred phosphite adjuvants are of formula tris(2,4-di-tert-butyl-phenyl) phosphite (e.g. trade name 168 Alkanox 240) or bis(2,4-di-tert-butyl-phenyl)pentaerythritol-diphosphite (e.g. trade name 626 Alkanox P-24).

Phosphines of use in the invention may be those of formula $(R^1)_3P$ wherein each $R^1$ independently represents a $C_{1-20}$ alkyl group, a $C_{6-18}$ aryl group, a $C_{7-20}$ alkylaryl group or hydrogen. Preferably, the phosphine is based on a bisarylalkyl species, where the third $R^1$ is hydrogen. In particular the phosphine may be dimethylphosphine.

Acetylenes of use in the invention include ethyne, propyne and but-1/2-yne as well as compounds of formula $R^2C\equiv CR^2$ where each $R^2$ independently represents a $C_{1-20}$ alkyl group, a $C_{6-18}$ aryl group, a $C_{7-20}$ alkylaryl group or hydrogen. In particular $R^2$ may represent a $C_{6-10}$ aryl group. A preferred acetylene is therefore diphenylacetylene.

The adjuvant may also be a diene, e.g. a $C_{1-20}$ diene. However, in a preferred embodiment the diene should be cyclic, e.g. cyclohexadiene or cyclooctadiene, preferably 1,5-cyclooctadiene.

The adjuvant may also be a thiophene, e.g. dibenzothiophene.

Finally, the adjuvant may be an aluminium alkyl, e.g. trialkyl aluminium compound of formula $(R^4)_3Al$ wherein each $R^4$ independently represents a $C_{1-10}$ alkyl group. Preferably all the $R^4$ groups are the same and especially preferably the $R^4$ group is methyl, ethyl, propyl or butyl.

The inventors have surprisingly discovered that the adjuvants discussed above can affect the molecular weight of the produced polymer and therefore offer an alternative method for controlling molecular weight and molecular weight distribution in a polymerisation process. Moreover, it has been surprisingly found that certain of adjuvants can affect the molecular weight of one of the polymer components (i.e. the higher or lower molecular weight component) whilst essentially not affecting the molecular weight of the other component. This is even more surprising since the adjuvants can effect changes for two different catalytic sites within a single catalyst family, e.g. the metallocene family.

Furthermore, the adjuvants of the invention may be readily used to adjust the ratio of high to low molecular weight components in a polymer product. The use of adjuvants therefore allows even greater control of the polymerisation process not possible with conventional controlling techniques, e.g. using hydrogen, which normally affects the molecular weight of both components. The use of adjuvants in conjunction with hydrogen is particularly favourable.

Thus, phosphine based adjuvants may be used to decrease the ratio of high molecular weight component to low molecular weight component (HMW/LMW), i.e. by using a phosphine adjuvant the amount of lower molecular weight component is increased relative to the amount of polymer product formed from the high molecular weight component. Using phosphine adjuvants it is believed that the HMW/LMW ratio may be reduced by at least 10%, preferably at least 20%, e.g. at least 30%, especially up to 50%. Moreover, it is believed that whilst phosphine adjuvants have an insignificant affect on the molecular weight of the lower molecular weight component (i.e. this does not change by more than 10%), the molecular weight of the higher molecular weight component is significantly increased, i.e. by greater than 10%, e.g. by 15%.

Thiophene adjuvants may also be used to decrease the ratio of high molecular weight component to low molecular weight component (HMW/LMW). Using thiophene adjuvants it is believed that the HMW/LMW ratio may be reduced by 10%, preferably 20%, e.g. 30%, especially up to 50%. Moreover, it is believed that thiophene adjuvants have almost no affect on the molecular weight of the higher or lower molecular weight component (i.e. any change is less than 10%).

Dienes adjuvants may also be used to decrease the ratio of high molecular weight component to low molecular weight component (HMW/LMW). Using diene adjuvants it is believed that the HMW/LMW ratio may be reduced by 10%, preferably 20%, e.g. 30%, especially up to 50%. It is also envisaged that diene adjuvants may decrease the molecular weight of the HMW component (e.g. by approximately 15%) whilst having no significant affect on the molecular weight of the LMW component.

Phosphite adjuvants may also be used to decrease the ratio of high molecular weight component to low molecular weight component (HMW/LMW). Using phosphate adjuvants it is believed that the HMW/LMW ratio may be reduced by 10%, preferably 20%, e.g. 30%, especially up to 50%. It is also envisaged that phosphate adjuvants may decrease the molecular weight of the HMW component (e.g. by approximately 20%) whilst having an insignificant affect on the LMW component.

Aluminum alkyl adjuvants may also be used to decrease the ratio of high molecular weight component to low molecular weight component (HMW/LMW). Using aluminium alkyl adjuvants it is believed that the HMW/LMW ratio may be reduced by 10%, preferably 20%, e.g. 30%, especially up to 50%. Such adjuvants do not significantly affect the MW of the HMW component but do significantly reduce the MW of the LMW component (e.g. by 30%).

Finally, acetylene adjuvants may also be used to decrease the ratio of high molecular weight component to low molecular weight component (HMW/LMW). Using such adjuvants it is believed that the HMW/LMW ratio may be reduced by 10%, preferably 20%, e.g. 30%, especially up to 50%.

Conversely, it has been found that $CO_2$ has little affect on the HMW/LMW ratio.

Thus, the adjuvants of the invention may double the ratio between the amount of low molecular weight component and high molecular weight component.

The adjuvants of the invention are-added to the reactor vessel at concentrations that will be readily determined by the person skilled in the art. For example, aluminium alkyls may be used in a molar ratio of 100–200 Al/metallocene. If chromium sites are present the molar ratio of Al/Cr should be 0.5 to 5. The other adjuvants may be employed at molar ratios of adjuvant to transition metal of 0.05 to 10.

Alternatively viewed the amount of adjuvant added may be between 0.0001 to 0.005 mmol/ml of reactor vessel solvent, e.g isobutane. Preferably the amount of adjuvant added may be between. 0.0003 to 0.004 mmol/ml.

Since these adjuvants affect the weight average molecular weight and the ratio of high to low molecular weight components of the polymer in different ways they offer an alternative way to control a polymerization process than using hydrogen. Typically, hydrogen is used to control molecular weight but hydrogen cannot always be used to make proper adjustments. For example, if a polymer product was found to contain too much high molecular weight component simple manipulation of the hydrogen concentration may not be sufficient since this would normally affect the proportion of low molecular weight component present. By using certain of the adjuvants in the present invention, MW of the high MW component can be adjusted without affecting the LMW component.

In another scenario, it may be that the molecular weight of one of the polymer components is too high or low whilst the molecular weight of the other component is ideal. Manipulation of hydrogen concentration alone would affect the molecular weight of both components and hence the adjuvants of the invention may be employed to adjust specifically the molecular weight of one component in a polymer composition.

Such manipulation allows excellent quality control since the formation of off-specification polymer can be abruptly stopped by feeding adjuvants into the reactor to return the polymer to its desired composition. Thus, in another aspect the invention provides the use of adjuvants as hereinbefore described to return an off specification production back to its desired composition, preferably simultaneously adjusting hydrogen feed.

For a continuous polymerisation process, teh adjuvants should preferably also be added continuously and the addition rates should preferably be continuously monitored and if necessary manipulated.

It is also within the scope of the invention to use more than one adjuvant simultaneously. Moreover, adjuvants can be added to a reactor vessel continuously or intermittently depending on the polymerisation requirements. Adjuvants may also be formed in situ within a reactor or its feed lines.

One or more adjuvants would preferably be used in the following way: The polymer from the reactor is sampled and analysed, preferably by in-line analysers installed in the polymerisation plant, e.g. Theological measurements. To provide additional information about the polymer composition, these measurements could be compared with predicted properties of one or more polymer components expected from the polymerization conditions. If a deviation is found between the actual composition and the target composition in terms of ratio of molecular weight and fractions of these components, a change is effected in at least one adjuvant feed, and preferably also in the hydrogen feed, in order to bring the composition to the target composition. For example, if in the catalyst system of our examples, it is found that the actual fraction of HMW polymer component is higher than target, then the feed of thiophene adjuvant should be increased. However, the decrease of the fraction of the HMW polymer component would result in a polymer with lower average MW. Therefore, if the average MW (or MFR—melt flow rate) was acceptable, hydrogen would have to be decreased simultaneously with the increase of thiophene.

The multisite catalysts used in the process of the invention may of course require the use of corresponding co-catalysts or catalyst activators and in this regard any appropriate co-catalyst or activator may be used. Thus for η-ligand complexes, aluminoxane or boron compound cocatalysts may be used and are preferably incorporated into the particulate catalyst.

Preferred aluminoxanes include $C_{1-10}$ alkyl aluminoxanes, in particular methyl aluminoxane (MAO) and aluminoxanes in which the alkyl groups comprise isobutyl groups optionally together with methyl groups. Such aluminoxanes may be used as the sole co-catalyst or alternatively may be used together with other co-catalysts. Thus besides or in addition to aluminoxanes other cation complex forming catalyst activators may be used. In this regard mention may be made of the silver and boron compounds known in the art. What is required of such activators is that they should react with the η-liganded complex to yield an organometallic cation and a non-coordinating anion (see for example the discussion on non-coordinating anions J⁻ in EP-A-617052 (Asahi)).

Aluminoxane co-catalysts are described by Hoechst in WO 94/28034.

It is particularly desirable that the multisite catalysts be supported on a solid substrate for use in such polymerization reactions. Such substrates are preferably porous particulates, e.g. inorganic oxides such as silica, alumina, silica-alumina or zirconia, inorganic halides such as magnesium chloride, or porous polymer particles, e.g. acrylate polymer particles or styrene-divinylbenzene polymer particles. Weight average median particle sizes are preferably in the range 10 to 60 μm and porosities are preferably in the range 1 to 3 mL/g. The complex may be loaded onto the support before, or more preferably after it has been reacted with a co-catalyst. Desirably, inorganic supports are heat treated (calcined) before being loaded with the complex.

The cocatalysts that may be used may either be incorporated into the particulate catalyst (as is conventional in metallocene catalyst chemistry) or added separately or both.

The two active catalytic compounds are preferably uniformly distributed over the support (carrier) particles, especially with each type of compound being uniformly distributed on the same particles.

The process of the invention may be the only polymerisation stage in a synthesis and may be carried out in a single reactor, Alternatively, the entire polymerisation process of which this polymerisation stage forms a part may be effected in a number of stages and in a series of two or more reactors.

Each polymerization stage may be effected using conventional procedures, e.g. as a slurry, gas phase, solution or high pressure polymerization. Slurry polymerisation includes polymerisation at slightly supercritical conditions. Mixed gas phase and slurry reactors are preferred. For the process stage of the invention, slurry phase polymerisation is preferred. Slurry polymerization (e.g. bulk polymerization) is preferably effected, e.g. in a tank reactor or more preferably a loop reactor. The entire polymerization process may use a series of two or more reactors, preferably loop and/or gas phase reactors, e.g. a combination of loop and loop, gas phase and gas phase or most preferably loop and gas phase reactors especially as described in EP-B-517868 and WO 96/18662. In slurry reactors, if a major monomer is propylene this may also function as a solvent/diluent as well as a reagent. If the major monomer is ethylene, a non-polymerizable organic compound, e.g. a $C_{3-10}$ alkane, for example propane or isobutane, may be used as a diluent. Where this is done, the volatile non-reacted or non-reactive materials will desirably be recovered and reused. Polymerisation techniques are of course well known and would be readily effected by the artisan.

The reactor used in the polymerization process of the invention is preferably used in continuous operation. This should be understood also to include the case when feeds to and flows from the reactor may be intermittent if the time constant of the intermittent flows are shorter than the average residence time in the reactor.

Typical reaction conditions for loop and gas phase reactors are: loop—temperature 60–110° C., pressure 30–70 bar, mean residence time 30–80 minutes; and gas phase—temperature 60–110° C. (preferably 80–105° C.), pressure 10–25 bar, mean residence time 20–300 minutes. Where hydrogen is used to control molecular weight/$MFR_2$, the hydrogen partial pressure will typically be 0.0001 to 0.5 bar, The catalyst composition may be fed directly to the reactor stage in question, or may—wholly or in part—be added to one preceding stage like a reactor, especially a prepolymerisation reactor or a particulate catalyst pretreatment step, like a precontact step between catalyst and cocatalyst. The final form of the catalyst composition may be generated in situ in the polymerisation process. Also, the catalyst may be added semi-continuously, i.e. at intervals shorter than the residence time of the reactor in question.

The adjuvant or adjuvants to be employed on the invention may also be fed directly to the reactor stage in question, or may—wholly or in part—be added to one preceding stage like a reactor, especially a prepolymerisation reactor. In a preferred embodiment, the amount of adjuvant added is controlled so as to return the polymer product to its desired composition.

Hydrogen may be used in the process of the invention in conjunction with the adjuvants. Thus use of hydrogen to control molecular weight is well-known in the art.

The polymer produced by the process of the invention can be formulated together with conventional additives, e.g. antioxidants, UV-stabilizers, antistatic agents, colours, fillers, plasticizers, etc. and can be used for fibre or film extrusion or for pipes, or for cable or wire applications or for moulding, e.g. injection moulding, blow moulding, rotational moulding, etc., using conventional moulding and extrusion equipment.

It is also observed that polymers degrade due to the action of oxygen, heat, light etc. It is therefore usual to mix into a polymer an antioxidant at the extrusion stage of processing. However, some degradation of the polymer may occur prior to extrusion e.g. where there is delay between polymer manufacture and subsequent extrusion. Some polymers may also remain unextruded. In the present invention, phosphites may be used as the adjuvant to manipulate the polymer molecular weight. Such phosphites also act as antioxidants and hence polymers produced using phosphites as the adjuvant already possess an amount of antioxidant material prior to extrusion.

The final polymer product of the process of the invention will preferably have a $MFR_{21}$ of about 1 to an $MFR_2$ of about 100, a weight average molecular weight (MW) of 30000 to 500000, a melting point of 100–165° C. (e.g. 100–136° C. for polyethylenes and 120 to 165° C. for polypropylenes) and a crystallinity of 20 to 70%. The polymer made of a single stage of a multistage process is preferably from $MFR_{21}$ about 0.01 to $MFR_2$ about 5000, (i.e. if only this reaction stage were performed using the same reaction conditions then these would be the MFR values).

All publications referred to herein are hereby incorporated by reference.

The invention will now be illustrated further by reference to the following non-limiting Examples.

EXAMPLES

Preparation of Catalyst 1

3.000 g silica (previously calcined at 600° C.) was added to a Thomas bottle containing a magnetic stirrer. 19.2 mg $(Cp^*)_2ZrCl_2$ (bis(pentamethylcyclopentadienyl) zirconium dichloride) and 26.9 mg rac($Me_2Si$(4-phenyl-2-methyl-Ind)$_2ZrCl_2$) (rac-dimethylsilylbis(2-methyl- 4-phenyl-indenyl) zirconium dichloride) were added to a second Thomas bottle containing a magnetic stirrer. In a third Thomas bottle 11 ml toluene and 4.0 ml MAO/toluene (Albemarle 30 wt % MAO) were mixed. The MAO/toluene solution of the third bottle was added to the second bottle containing the metallocenes under continuous stirring. The reaction was allowed to take place for 30 minutes before the metallocene/MAO/toluene solution was added slowly by syringe to the Thomas bottle containing the silica. The slurry was then stirred at ambient temperature overnight. Drying was performed by blowing argon through the Thomas bottle for three hours at 50° C.

Preparation of Catalyst 2

3.044 g silica (previously calcined at 575° C.) was added to a first Thomas bottle containing a magnetic stirrer. To a second Thomas bottle 36.0 mg $(Cp^*)_2ZrCl_2$ was added and to a third Thomas bottle 20.0 mg rac($Me_2Si$(4-phenyl-2-methyl-Ind)$_2ZrCl_2$) was added. In a fourth Thomas bottle 14.65 ml toluene and 5.35 ml MAO/toluene (Albemarle 30 wt % MAO) was mixed. 5.0 ml of the MAO/toluene solution of the fourth bottle was added to the third bottle containing the rac($Me_2Si$(4-phenyl-2-methyl-Ind)$_2ZrCl_2$) under continuous stirring. To the second Thomas bottle containing the $(Cp^*)_2ZrCl_2$ complex was added 14.15 ml of the MAO/toluene solution from the fourth Thomas bottle. The metallocene/MAO reaction took place for 30 minutes before 0.85 ml of the solution in the third Thomas bottle was added to the second Thomas bottle Then the total content of the second Thomas bottle was added by syringe to the first Thomas bottle containing the carrier. The slurry was then stirred at ambient temperature overnight. Drying was performed by blowing argon through the Thomas bottle for three hours at 50° C.

Polymerisations were carried out in a 1 liter reactor fitted with a stirrer. 0.5 l of isobutane and the catalyst were added to the reactor and the temperature adjusted to 80° C. Ethylene was added through a pressure control valve set at 30 bar pressure. No hydrogen or comonomers were employed. Polymerisation was terminated by venting off the overpressure within the reactor. In addition, the adjuvants described in Table 1 were added to the reactor.

Two series of, polymerisations were carried out, one with catalyst 1 and one with catalyst 2. Table 2 gives the results.

TABLE 1

| Adjuvant | mmol/ml | Ref |
|---|---|---|
| tris(2,4,6-trimethylphenyl)phosphine | 0.000375 | A1 |
| dibenzothiophene | 0.000375 | A2 |
| diphenylacetylene | 0.00375 | A3 |
| 1,5-cyclooctadiene | 0.00375 | A4 |
| tris(2,4-di-tert-butyl-phenyl)phosphite | 0.00376 | A5 |
| trimethyl aluminium | 0.3 | A6 |

TABLE 2

Results from polymerisations with addition of adjuvants. The specified amount of adjuvant solution was added throughout the polymerisation at 0, 10, 20 and optionally 40 mins where polymerisation time allowed. Runs 1 to 9 utilise catalyst 1, runs 10 to 15 utilise catalyst 2.

| Run | cat. mg | time, min | yield (g) | activity g/g/h | adjuvant |
|---|---|---|---|---|---|
| 1 | 193 | 45 | 69.7 | 481.5 | none |
| 2 | 203 | 45 | 42.4 | 278.5 | A1, 4 ml |
| 3 | 192 | 45 | 57.8 | 401.4 | A2, 2 ml |
| 4 | 210 | 25 | 32.9 | 376.0 | A3, 4 ml |
| 5 | 200 | 45 | 37.1 | 247.3 | A4, 4 ml |
| 6 | 205 | 45 | 88 | 572.4 | none |
| 7 | 202 | 29.5 | 23.7 | 238.6 | A5, 4 ml |
| 8 | 208 | 45 | 68 | 435.9 | $CO_2$ in $N_2$* |
| 9 | 206 | 45 | 64.7 | 418.8 | A6, 8 ml |
| 10 | 325 | 45 | 73.2 | 300 | none |
| 11 | 298 | 45 | 54.6 | 244 | A5, 4 ml |
| 12 | 300 | 45 | 58.0 | 258 | A3, 2 ml |
| 13 | 322 | 45 | 44.8 | 186 | A3, 4 ml |
| 14 | 307 | 45 | 58.6 | 255 | A4, 4 ml |
| 15 | 305 | 45 | 70.0 | 306 | A6, 8 ml |

*0.83 mol % $CO_2$ in $N_2$, 4 ml at atmospheric pressure

Table 3

Physical properties of the polymers produced. The properties of the HMW component are denoted by the subscript (1) and the properties of the low molecular weight component are denoted by the subscript (2).

Molecular weight distribution and molecular weights were measured by GPC equipment (gel permeation chromatography, size exclusion chromatography). See H. G. Barth and J. M. Mays (Eds.): Modern Methods of Polymer Characterization (Chemical Analysis Vol. 113), John Wiley & Sons, 1991.

A Waters 150 CV instrument with an RI-detector detector was used.

Running conditions:

Temperature: 140° C.

Flowrate: 1,0 ml/min

Mw is the weight average molecular weight.

Mn is the number average molecular weight.

Mw/Mn is ratio between these.

In order to find the compositions of the polymer produced, the polymers were analysed by GPC (gel permeation chromatography) to find the molecular weight distributions which were represented graphically in conventional. GPC curves (abscissa=log Mw, ordinate=d(wt fraction)/dlog (Mw).

In order to obtain quantitative information about the effect of each adjuvant on the composition of the polymers produced, the molecular weight distribution (MWD) curves (obtained from GPC analyses) were deconvoluted The MWD curves were split into individual single-site MWD contributions, one for each catalyst site. Deconvolutions were carried out as described by Blom et al., Macromol. Chem. Phys. 202: 719–725, No. 5, 2001 and Andersen et al., Macromol. Chem. Phys. 202: 726–733, No. 5, 2001. The sum of the two theoretical MWD curves were fitted to the experimental curve by least-squares fitting of the following three parameters:
1. w1/w2—the weight ratio of the two contributions
2. Mw1—the Mw value of the HMW fraction
3. Mw2—the Mw value of the LMW fraction The results are given in Table 3.

TABLE 3

| | Results | | | | |
|---|---|---|---|---|---|
| Run | wt frac comp 1 w1 | wt frac comp 2 w2 | ratio w1/w2 | MW comp 1 Mw1 | MW comp 2 Mw2 |
| 1 | 0.87 | 0.13 | 6.7 | 780000 | 133000 |
| 2 | 0.79 | 0.21 | 3.8 | 900000 | 121000 |
| 3 | 0.79 | 0.21 | 3.8 | 810000 | 162000 |
| 4 | 0.59 | 0.41 | 1.4 | 760000 | 186000 |
| 5 | 0.75 | 0.25 | 3.0 | 640000 | 155000 |
| 6 | 0.84 | 0.16 | 5.3 | 630000 | 300000 |
| 7 | 0.57 | 0.43 | 1.3 | 490000 | 204000 |
| 8 | 0.85 | 0.15 | 5.7 | 600000 | 110000 |
| 9 | 0.68 | 0.32 | 2.1 | 660000 | 158000 |
| 10 | 0.16 | 0.84 | 0.19 | 1110000 | 353000 |
| 11 | 0.12 | 0.88 | 0.14 | 1100000 | 369000 |
| 12 | 0.12 | 0.88 | 0.14 | 1120000 | 370000 |
| 13 | 0.06 | 0.94 | 0.06 | 1900000 | 401000 |
| 14 | 0.13 | 0.87 | 0.15 | 1390000 | 351000 |
| 15 | 0.11 | 0.89 | 0.12 | 149000 | 238000 |

The invention claimed is:

1. A process for the preparation of a multimodal α-olefin polymer comprising polymerising in a polymerisation stage at least one α-olefin in the presence of a multisite catalyst and an adjuvant so as to produce a polymer having a relatively lower molecular weight component and a relatively higher molecular weight component, said adjuvant being selected from the group consisting of phosphines, phosphites, acetylenes, dienes and thiophenes and said adjuvant being capable of altering the ratio of the fraction of higher molecular weight component to the fraction of the lower molecular weight component by at least 10%.

2. A process for the preparation of a multimodal α-olefin polymer comprising polymerising in a continuous polymerisation stage at least one α-olefin in the presence of a multisite catalyst and an adjuvant so as to produce a polymer having a relatively lower molecular weight component and a relatively higher molecular weight component, said adjuvant being selected from the group consisting of phosphines, phosphites, acetylenes, dienes, and thiophenes and said adjuvant being capable of increasing or decreasing the molecular weight of one component relative to the other by at least 10%.

3. A process as claimed in claim 1 wherein the multisite catalyst comprises a particulate multisite catalyst where at least two active catalytic compounds are incorporated into the same catalyst particle.

4. A process as claimed in claim 3 wherein said multisite catalyst is formed from 2 different metallocene compounds.

5. A process as claimed in claim 4 wherein said multisite catalyst is formed from an unbridged bis-$\eta_5$ ligand metallocene and a bridged bis-$\eta_5$-ligand metallocene.

6. A process as claimed in claim 5 wherein said multisite catalyst is formed from a catalyst $Cp^*_2ZrCl_2$ and $Me_2Si(4-Ph-2-Meind)_2ZrCl_2$ where Cp* represents pentamethylcyclopentadienyl.

7. A process as claimed in claim 1 wherein said α-olefin is ethylene or propylene.

8. A process as claimed in claim 1 wherein said polymer is an ethylene homopolymer or an ethylene/hexene copolymer.

9. A process as claimed in claim 1 wherein said phosphine adjuvant is a bisaryl alkyl or bisalkyl phosphine.

10. A process as claimed in claim 9 wherein said phosphine adjuvant is dimethyiphosphine.

11. A process as claimed in claim 1 wherein said acetylene adjuvant is of formula $R^2C{\equiv}CR^2$ wherein $R^2$ is a $C_{6-10}$ aryl group.

12. A process as claimed in claim 11 wherein said adjuvant is bisphenylacetylene.

13. A process as claimed in claim 1 wherein said adjuvant is a cyclic diene.

14. A process as claimed in claim 13 wherein said adjuvant is 1,5-cyclooctadiene.

15. A process as claimed in claim 1 wherein said adjuvant is dibenzothiophene or $AlR^4_3$ wherein $R^4$ methyl, ethyl, propyl or butyl.

16. A process as claimed in claim 1 wherein hydrogen is additionally fed into the reactor vessel.

17. A process as claimed in claim 1 wherein adjuvant is added to the reactor vessel continuously.

* * * * *